United States Patent [19]

Yamazaki et al.

[11] Patent Number: 4,507,447

[45] Date of Patent: Mar. 26, 1985

[54] POLYURETHANE ADHESIVE COMPOSITIONS CONTAINING OXYACID OF PHOSPHORUS AND SILANE COUPLING AGENT

[75] Inventors: Kyuya Yamazaki, Ibaraki; Sachio Igarashi, Suita, both of Japan

[73] Assignee: Takeda Chemical Industries, Ltd., Osaka, Japan

[21] Appl. No.: 530,124

[22] Filed: Sep. 7, 1983

Related U.S. Application Data

[63] Continuation-in-part of Ser. No. 455,895, Jan. 5, 1983, abandoned.

[51] Int. Cl.$^3$ .................. C08L 63/02; C08L 75/04
[52] U.S. Cl. .............................. 525/528; 525/111; 525/440; 528/27; 528/28
[58] Field of Search .................... 525/528; 528/27

[56] References Cited

U.S. PATENT DOCUMENTS 4,206,299  6/1980  Yamazaki ..................... 428/288

FOREIGN PATENT DOCUMENTS 25945  8/1979  Japan .
58277  4/1980  Japan .

Primary Examiner—Wilbert J. Briggs, Sr.
Attorney, Agent, or Firm—Wenderoth, Lind & Ponack

[57] ABSTRACT

A polyurethane adhesive composition, which comprises an organic polyisocyanate, a polyol, an oxyacid of phosphorus or a derivative thereof, an epoxy resin and a silane coupling agent.

The polyurethane adhesive composition, when used as an adhesive for packaging materials for food, provides the bond showing outstandingly excellent adhesion strength, heat resistance and hot-water resistance between metal foil such as aluminum foil and films of plastics such as polyethylene, polypropylene, nylon and polyethylene terephthalate etc.

9 Claims, No Drawings

4,507,447

POLYURETHANE ADHESIVE COMPOSITIONS CONTAINING OXYACID OF PHOSPHORUS AND SILANE COUPLING AGENT

This application is a continuation-in-part of application Ser. No. 455,895, filed Jan. 5, 1983 (now abandoned).

This invention relates to novel adhesive compositions, and is particularly concerned with polyurethane adhesive compositions which are useful as an adhesive for metals, plastics, rubber, etc.

Recently, as packaging materials for foodstuffs, etc., there have been developed and put in wide use multiply composite films consisting of films of plastics, such as polyethylene, polypropylene, nylon, polyester and polyvinyl chloride, being laminated to metal foil, such as aluminum foil, in two, three or four layers.

For bonding together these plastic films or metal foil, there has been known a method of applying over it an adhesive composition containing a linear saturated polyester glycol, an epoxy resin having not less than 2 hydroxyl groups, a polyisocyanate compound and an ester of phosphoric acid. However, this method suffers from the defects that the resultant bond is not always provided with adequate adhesion strength and is inferior in heat resistance or chemical resistance, such as acid- and alkali resistance. For example, there is encountered the disadvantage that the composite film fabricated by the method, when heat-sterilized by high-temperature hot water of not less than 120° C. after highly acid food containing free fatty acids is packaged therein, not only shows reduction in adhesion strength between the metal foil and the plastic films but also displays lowered strength as a packaging material and, in extreme cases, develops complete delamination, with the resultant induction of pinholes through the metal foil, reducing the air-barrier properties inherent to metals and hence, constituting a serious hindrance to achievement of the object of preserving foodstuffs for a long period of time.

The present inventors, after extensive investigation conducted with a specific view to eliminating these defects, found that incorporation of a silane coupling agent in to the said composition can produce adhesive compositions having adhesion strength by far superior to those obtained by the conventionally known processes and thus can yield coating films having outstandingly excellent heat- and chemical resistance. This finding was followed by further investigation and has culminated in the completion of this invention. Thus, this invention relates to a polyurethane adhesive composition, which comprises an organic polyisocyanate, a polyol, an oxyacid of phosphorus or a derivative thereof, an epoxy resin and a silane coupling agent.

Examples of the organic polyisocyanates which are useful in this invention include polyisocyanate monomers, such as aliphatic diisocyanates being exemplified by trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, 2,6-diisocyanatomethyl caproate, etc., alicyclic diisocyanates being exemplified by 1,3-cyclopentanediisocyanate, 1,4-cyclohexanediisocyanate, 1,3-cyclohexanediisocyanate, 3-isocyanatomethyl-3,5,5-trimethylcyclohexyl isocyanate, 4,4'-methylenebis(cyclohexylisocyanate), methyl-2,4-cyclohexanediisocyanate, methyl-2,6-cyclohexanediisocyanate, 1,4-bis(isocyanatomethyl)cyclohexane, 1,3-bis-(isocyanatomethyl)cyclohexane, etc., aromatic diisocyanates being exemplified by m-phenylene diisocyanate, p-phenylene diisocyanate, 4,4'-diphenyl diisocyanate, 1,5-naphthalenediisocyanate, 4,4'-diphenylmethanediisocyanate, 2,4- or 2,6-tolylene diisocyanate or mixture thereof, 4,4'-toluidinediisocyanate, dianisidinediisocyanate, 4,4'-diphenyl ether diisocyanate, etc., aralkyl diisocyanates being exemplified by 1,3- or 1,4-xylylene diisocyanate or mixture thereof, $\omega,\omega'$-diisocyanate-1,4-diethylbenzene and the like, organic triisocyanates being exemplified by triphenylmethane-4,4'-4"-triisocyanate, 1,3,5-triisocyanatobenzene, 2,4,6-triisocyanatotoluene, etc., and organic tetraisocyanates being exemplified by 4,4'-diphenyldimethylmethane-2,2'-5,5'-tetraisocyanate and the like; dimers, trimers, biurets and allophanates derived from the above polyisocyanate monomers; polyisocyanates having a 2,4,6-oxadiazinetrione ring obtained from carbon dioxide and the above polyisocyanate monomers; adducts formed with low-molecular-weight polyols having a molecular weight of not more than 200 such as ethylene glycol, propylene glycol, butylene glycol, hexylene glycol, neopentyl glycol, cyclohexanedimethanol, diethylene glycol, triethylene glycol, dipropylene glycol, glycerol, trimethylolpropane, pentaerythritol and sorbitol; or adducts formed with those having a molecular weight of about 200 to 10,000 to be described hereinafter such as polyester polyols, polyether polyols, polyether ester polyols, polyester amide polyols, acrylic polyols, polyhydroxyalkanes and castor oil.

Examples of the polyols which are useful in this invention include compounds having a number of functional groups of about 2 to 6, preferably about 2 to 4, and a molecular weight of 200 to 10,000, preferably about 300 to 5,000. More particularly, there may be mentioned polyester polyols, polyether polyols, polyether ester polyols, polyester amide polyols, acrylic polyols, polyhydroxyalkanes, castor oil, polyurethane polyols or mixtures thereof.

Examples of such polyester polyols include polyester polyols obtained by reacting dibasic acids, such as terephthalic acid, isophthalic acid, adipic acid and sebacic acid, their di alkyl ester or a mixture thereof with glycols, such as ethylene glycol, propylene glycol, diethylene glycol, butylene glycol and neopentyl glycol or a mixture thereof.

Examples of the polyether polyols include polyether polyols obtained by polymerizing oxirane compounds such as ethylene oxide, propylene oxide, butylene oxide and tetrahydrofuran with the use of low molecular weight polyols, such as water, ethylene glycol, propylene glycol, trimethylolpropane and glycerol, as initiator.

Examples of the polyester amide polyols include those obtained by the combined use of starting materials having amino groups such as ethylenediamine, propylenediamine and hexamethylene diamine in the above esterification reaction.

Examples of the acrylic polyols include those obtained by copolymerizing monomers having not less than one hydroxyl group in the molecule, such as hydroxyethyl acrylate, hydroxypropyl acrylate, hydroxybutyl acrylate, etc. or their corresponding methacrylic acid derivatives, with acrylic acid, methacrylic acid or their esters.

Examples of the polyhydroxyalkanes include polybutadiene polyols obtained by polymerizing butadiene or copolymerizing butadiene with acrylamide, etc.

The polyurethane polyols are polyols having the urethane linkage in the molecule and are for example obtained by reacting polyether polyols, polyester polyols or polyether ester polyols having a molecular weight of about 200 to 5,000 with the above-mentioned organic polyisocyanates in the NCO/OH ratio of less than 1, preferably not more than about 0.8.

Besides the polyols described in the above, further, low-molecular-weight polyols having a molecular weight of 62 to 200 may be mixed in order to adjust the average molecular weight of the polyol component. Examples of these low-molecular-weight polyols include ethylene glycol, propylene glycol, butylene glycol, diethylene glycol, dipropylene glycol, hexylene glycol, neopentyl glycol, cyclohexanedimethanol, glycerol, trimethylolpropane and the like.

With reference to the oxyacids of phosphorus or derivatives thereof which are useful in this invention, examples of the oxyacids of phosphorus include phosphoric acids, such as hypophosphorus acid, phosphorous acid, orthophosphoric acid and hypophosphoric acid, and condensed phosphoric acids, such as metaphosphoric acid, pyrophosphoric acid, tripolyphosphoric acid, polyphosphoric acid and ultraphosphoric acid; examples of the derivatives of the oxyacids of phosphorus as mentioned above include salts of phosphoric acid and condensed phosphoric acid with sodium, potassium, etc., monoesters of oxyacids of phosphorus such as monomethyl orthophosphate, monoethyl orthophosphate, monopropyl orthophosphate, monobutyl orthophosphate, mono-2-ethylhexyl orthophosphate, monophenyl orthophosphate, monomethyl phosphite, monoethyl phosphite, monopropyl phosphite, monobutyl phosphite, mono-2-ethylhexyl phosphite and monophenyl phosphite, di- and triesters of oxyacids of phosphorus such as di-2-ethylhexyl orthophosphate, diphenyl orthophosphate, trimethyl orthophosphate, triethyl orthophosphate, tripropyl orthophosphate, tributyl orthophosphate, tri-2-ethylhexyl orthophosphate, triphenyl orthophosphate, dimethyl phosphite, diethyl phosphite, dipropyl phosphite, dibutyl phosphite, di-2-ethylhexyl phosphite, diphenyl phosphite, trimethyl phosphite, triethyl phosphite, tripropyl phosphite, tributyl phosphite, tri-2-ethylhexyl phosphite and triphenyl phosphite, and mono-, di- and tri-esterified products of condensed phosphoric acid with alcohols, such as adducts obtained by allowing epoxy compounds such as ethylene oxide and propylene oxide to the above oxyacids of phosphorus.

The oxyacids of phosphorus or derivatives thereof as mentioned above may be used alone or as a mixture of not less than two kinds.

Among the above compounds, those having not less than one free oxyacid are particularly preferable, and orthophosphoric acid, polyphosphoric acid or partial adducts of orthophosphoric acid or polyphosphoric acid with epoxy compounds are favorable. The oxyacid of phosphorus or derivative thereof is capable of forming the ionic or covalent bond with metals, and also can react with the epoxy resin and isocyanate group to be described hereinafter, with the result that they play a very important role in enhancing particularly the performance of adhesion toward metals and also in improving the acid and alkali resistance. Their amount to be added is in the range of about 0.01 to 10 weight percent against the total adhesive composition, preferably about 0.05 to 5 weight percent, more preferably about 0.1 to 1 weight percent.

As the epoxy resins which are useful in this invention, by way of example, use is made of reaction products between polyhydric phenols, such as bisphenol A and tetrahydroxydiphenylethane, and polyfunctional halohydrins, such as epichlorohydrin, which have a molecular weight of about 320 to 5,000, preferably about 320 to 4,000 and an epoxy equivalent of about 140 to 3,500, preferably 450 to 1000. The amount of the epoxy resin is in the range of about 1 to 50 weight percent, preferably about 5 to 30 weight percent, against the total adhesive composition.

Examples of the silane coupling agents which are useful in this invention include compounds having structural formula of $R-Si\equiv(X)_3$ or $R-Si\equiv(R')(X)_2$ (wherein R is an organic group having a vinyl, epoxy, amino, imino or mercapto group; R' is a c1-8 alkyl group; X is a methoxy or ethoxy group or a chlorine atom), and is typified for example by chlorosilanes such as vinyltrichlorosilane etc., imino- or aminosilanes such as N-(dimethoxymethylsilylpropyl)ethylenediamine and N-(triethoxysilylpropyl)ethylenediamine, γ-aminopropyltriethoxysilane etc., epoxysilanes such as γ-glycidoxypropyltrimethoxysilane and β-(3,4-epoxycyclohexyl)ethyltrimethoxysilane etc., vinyl silanes such as vinyltriethoxysilane, vinyl tris(β-methoxyethoxy)silane etc. and mercaptosilanes such as γ-mercaptopropyltrimethoxysilane etc. The amount of the silane coupling agent to be added is in the range of about 0.05 to 20 weight percent against the total adhesive composition, preferably about 0.1 to 5 weight percent. In addition to the silane coupling agent, if necessary, use can be made of additives such as antioxidants, ultraviolet absorbers, hydrolysis stabilizers, antifungal or antibacterial agents, thickening agents, plasticizers, pigments and fillers. Also, known catalysts, additives, etc. can be used for the regulation of the curing reaction.

The polyurethane adhesive composition of this invention is obtained by admixing the above-mentioned organic polyisocyanate, polyol, oxyacid of phosphorus or derivative thereof, the epoxy resin and the silane coupling agent.

The NCO/H ratio, i.e., the number of the NCO group of the organic polyisocyanate/the number of the active hydrogen group (H) of the polyol, the oxyacid of phosphorus or the derivative thereof and the epoxy resin is chosen in the range of about 0.4 to 20.

The polyurethane adhesive composition of this invention can be used either as one can type (one-component) or two-can type (two-component) adhesive according to the intended object.

Thus, the one-can type adhesive is obtained by reacting a uniformly mixed solution of a polyol, an oxyacid of phosphorus or derivative thereof, an epoxy resin and a silane coupling agent with an organic polyisocyanate in the presence of an excess of isocyanate group. This is a type of causing cure by the reaction with water or moisture in the air. In producing the one-can type adhesive, it is convenient to carry out the reaction of the isocyanate group (NCO) with the active hydrogen group (H) of the polyol and oxyacid of phosphorus or derivative thereof and the epoxy resin in an NCO/H ratio of about 1.5 to 20, preferably about 2 to 10. Less than 1.5 of the NCO/H ratio results in too much increased viscosity of the resultant composition, and leads in some instance to its gelation. And, when the NCO/H ratio is in excess of 20, there develop deteriorated curing characteristics, and the composition with adequate adhesion strength in some instances cannot be obtained. The reaction is carried out normally at 30° to 100° C., whereby the organic metal catalyst, tertiary amine catalyst, etc. if desired, may be added.

As another embodiment of this invention, there may be mentioned the so-called two-can type, which comprises mixing a polyol as the principal component with a curing agent of an organic polyisocyanate immediately before use. The oxyacid of phosphorus or derivative thereof and the silane coupling agent are respectively added to either the polyisocyanate or polyol, but it is favorable to add either of them in advance to the polyol or a mixture thereof with the epoxy resin. In the case of the two-can type, the proportion in which the curing agent is mixed with the principal component is such as an NCO/H ratio may be about 0.4 to 10, preferably about 0.5 to 2.0. As is the case with the one-can type, it is possible in the case of the two-can type to use catalysts such as organic metal and tertiary amine catalysts.

Normally, the two-can type exhibits faster curing rate and better adhesion performance than the one-can type, finding wider application. Though the two-can type showed a shortened length of pot life, it can be used without difficulty by employing a device which is adapted to automatically deliver a principal component and a curing agent through separate stream lines at the determined weight ratio and only in the minimal weights required for coating application and to mix them immediately before use.

The adhesive composition of this invention, when it has a viscosity of about 100 to 10,000 cps., preferably about 100 to 5,000 cps., at normal temperature to 140° C., preferably normal temperature to 100° C., can be used as the solvent-free type.

When the viscosity exceeds the above range, such adhesive composition may also be diluted with an organic solvent, in whichever case it may be used as the one-can type or two-can type. As the organic solvent, use may be made of any solvent which is inert to the isocyanate group, such as esters being exemplified by ethyl acetate, butyl acetate 2-ethoxyethyl acetate, etc., ketones being typified by methyl ethyl ketone, methyl isobutyl ketone etc. aromatics being exemplified by toluene, xylene, etc. and ethers being exemplified by tetrahydrofuran, dioxane etc.

The procedure specifically prescribed for using the polyurethane adhesive composition of this invention comprises, for example, applying the adhesive composition to the surface of a film by means of a solvent type or solvent-free type laminator, joining the mating surfaces either after the solvent is evaporated in the case of the solvent type or directly in the case of the solvent-free type, and curing the composition at normal temperature or under heating.

Normally, it is favorable to use the adhesive composition in the application amount within the range of about 1.0 to 2.0 g/m² in the case of the solvent-free type and about 2.0 to 4.0 g/m² in the case of the solvent type.

As compared with the conventional solvent type, a solvent-free type of the adhesive composition of this invention permits the saving of energy and does not require solvent recovery facilities, thus enabling the overhead expenses to be reduced down to not more than the half of those for the conventional solvent type.

As compared with the conventional solvent-free type urethane adhesives, the adhesive composition of this invention exhibits faster curing characteristics and better adhesion performance, and particularly shows excellent adhesion strength, heat resistance, water resistance and chemical resistance when applied to films of plastics such as polyethylene terephthalate, nylon, polyethylene, polypropylene and polyvinyl chloride as well as metals such as aluminum, stainless steel, iron, copper and lead. On the other hand, a solvent type of the adhesive composition of this invention is superior in adhesion strength, heat- and chemical resistance to the conventional solvent type ones. Particularly, the epoxy rings in the resin are opened by an oxyacid of phosphorus or derivative thereof added in small amount, thus yielding coating films having excellent chemical resistance.

The polyurethane adhesive composition, when used for example as an adhesive for packaging materials for food, provides the bond showing outstandingly excellent adhesion strength, heat resistance and hot-water resistance between metal foil such as aluminum foil and films of plastics such as polyethylene, polypropylene, nylon and polyethylene terephthalate etc. The packaging materials thus prepared, when they are filled with foods in sealed relation and subjected to high-temperature, hot-water sterilization treatment at a temperature of not less than 120° C., are entirely free from delamination between the metal foil and the plastic film, and are therefore used advantageously as the packaging material which shows improved tolerance to foodstuffs and ensures the prolonged shelf lives of foodstuffs.

The examples and reference examples are described in the following to illustrate this invention more specifically.

EXAMPLE 1

A mixture of 500 g of polyoxypropylene glycol (mol. weight 1000), 1.8 g of polyphosphoric acid composed mainly of tetrapolyphosphoric acid and 4.6 g of N-(diethoxymethylsilylpropyl)ethylenediamine was heated at 90° C., and 50 g of an epoxy resin (mol. weight 1060; epoxy equivalent 650; Epicote 1002 ®; produced by Shell Chemical Co.) was added to it and dissolved uniformly. Then, the temperature of the solution was lowered to 70° C., and 360 g of diphenylmethane diisocyanate was added. The reaction was conducted at 70° C. for 3 hours.

By the above procedure, there was obtained an adhesive composition having an NCO group content of 7.5% and a viscosity of 1,000 cps at 90° C. (Composition 1).

By means of a solventless laminator, Composition 1 was applied at a temperature of 90° C. to a polyester film (PET, thickness 12μ) to an application rate of 1.5 g/m², followed by joining together the film and aluminum foil (Al, thickness 9μ). Then, Composition 1 was applied to the Al face to an application rate of 1.5 g/m², and cast poly polypropylene (CPP, thickness 60μ, corona-treated surface) was laid over it for joining them together to form a three-ply laminated film. The adhesive composition thus applied was allowed to cure at 40° C. for 3 days.

The adhesion strength between the Al and the CPP as measured was 900 g/15 mm (tensile speed of 300 mm/min., T-peel strength). From the multiple laminated film thus prepared, a pouch with the CPP facing inner was fabricated, and a 2% aqueous acetic acid solution was filled into it. After the sealed pouch was subjected to hot-water sterilization at 120° C. and under a pressure of 2 kg/cm² for 30 min., investigation was conducted on the degree of delamination and a change in adhesion strength. The results are as shown below:
Adhesion strength: 920 g/15 mm
The degree of delamination: The same as before hot-water sterilization.

EXAMPLE 2

A solution consisting of a mixture of 500 g of polyethylenebutylene adipate (mol. weight 2,000, ethylene glycol/1,4-butylene glycol=1/1 in molar ratio), 26.5 g of diethylene glycol and 1.3 g of an adduct from pyrophosphoric acid and propylene oxide (1/1.6 in molar ratio) was heated at 90° C., and 50 g of an epoxy resin (mol. weight 900, epoxy equivalent 450; Epicote 1001 ®; produced by Shell Chemical Co.) was added to it and dissolved uniformly. Then, the temperature of the mixture was lowered to 70° C., and 417.8 g of xylylene diisocyanate was added. The reaction was conducted at 70° C. for 4 hours. The reaction mixture was freed of the unreacted isocyanate monomer by the thin-layer distillation method at 180° C./1 mmHg, and there was obtained 760 g of a residue, which was then admixed uniformly with 7.6 g of γ-glycidoxypropyltrimethoxysilane, thus yielding an adhesive composition having an NCO group content of 4.8% and a viscosity of 1,500 cps. at 90° C. (Composition 2).

By the same procedure as in Example 1, Composition 2 was used for three-ply laminated film of PET/Al/CPP, and an adhesion test between the Al and the CPP was conducted. The results are as shown below:
Adhesion strength; 1,100 g/15 mm.
Adhesion strength after hot-water sterilization; 1,200 g/15 mm.
The degree of delamination after hot-water sterilization; the same as before the sterilization.

EXAMPLE 3

A solution consisting of a mixture of 500 g of polyoxypropylene glycol (mol. weight 1,000), 40 g of dipropylene glycol of diphenylmethane diisocyanate was added to it. The reaction was conducted at 70° C. for 3 hours, thus yielding a polyurethane polyisocyanate (curing agent) having an NCO group content of 16% and a viscosity at 40° C. of 1,300 cps.

A mixture of 500 g of polyoxypropylene glycol (mol. weight 1,000) and 2 g of a 1:1 (weight ratio) mixture of pyrophosphoric acid and sodium pyrophosphate was heated at 90° C. and 58 g of the epoxy resin as used in Example 2 was added. After the mixture was cooled to 70° C., 42.4 g of diphenylmethane diisocyanate and 6 g of γ-glycidoxypropyltrimethoxysilane were added, and the reaction was conducted at 70° C. for 3 hours, thus yielding a polyurethane polyol (principal component) having a hydroxyl value of 72 mg KOH/g and a viscosity of 2,500 cps. at 40° C.

100 g of the curing agent and 300 g of the principal component were mixed uniformly at 40° C., and there was obtained Composition 3, which showed a viscosity of 2,100 cps. at 40° C. Immediately, Composition 3 was used for three-ply laminated film of PET/Al/CPP, and an adhesion test on the bond between the Al and the CPP was conducted. The results are as shown below:
Adhesion strength; 1,050 g/15 mm.
Adhesion strength after hot-water sterilization; 1,000 g/15 mm.
The degree of delamination after hot-water sterilization; the same as before the sterilization.

EXAMPLE 4

A mixture of 411 g of a polyester glycol (mol. weight 600) prepared from a 1:1 mixture of isophthalic acid and adipic acid and diethylene glycol, and 1.0 g of an adduct of polyphosphoric acid (PPA) composed mainly of tetrapolyphosphoric acid and propylene oxide (PO) (PPA/PO=⅓ in molar ratio) was heated at 90° C., and 82.2 g of the epoxy resin as used in Example 1 and 2.5 g of γ-glycidoxypropyltrimethoxysilane were added and dissolved uniformly, thus yielding a polyol component (principal component) having a viscosity of 4,300 cps. at 60° C. and a hydroxyl value of 172 mg KOH/g.

230 g of the principal component was admixed uniformly with a curing agent of 100 g of a liquid diphenylmethane diisocyanate having an NCO group content of 29.4% (Isonate 143L ®; produced by Kasei Upjohn Co.) at 60° C., yielding Composition 4 having a viscosity of 1,500 cps at 60° C.

In the same manner as in Example 1, Composition 4 was immediately used for three-ply laminated film of PET/Al/CPP at 60° C., and an adhesion test on the bond between the Al and the CPP was conducted. The results are as shown below:
Adhesion strength; 1,300 g/15 mm.
Adhesion strength after hot-water sterilization; 1,250 g/15 mm.
The degree of delamination after hot-water sterilization; the same as before the sterilization.

EXAMPLE 5

A mixture of 900 g of a polyester glycol (mol. weight 650) having the composition of isophthalic acid/adipic acid=3/1 in molar ratio and ethylene glycol/neopentyl glycol=2/1 in molar ratio and 2.0 g of polyphosphoric acid composed mainly of tetrapolyphosphoric acid was heated at 90° C., and 90 g of the epoxy resin as used in Example 1 and 10 g of vinyltriethoxysilane were added and dissolved uniformly, thus yielding a polyol component (principal component) having a viscosity of 4,300 cps. at 70° C. and a hydroxyl value of 170 mg KOH/g.

188.2 g of xylylene diisocyanate was heated at 90° C., and 44.7 g of trimethylolpropane was gradually added to it. The reaction was carried out for 2 hours. Then, 232.9 g of the biuret derivative (an NCO group content of 22.8%) of hexamethylene diisocyanate was admixed uniformly with the mixture, thus yielding a polyurethane polyisocyanate (curing agent) having a viscosity of 1,120 cps. at 70° C. and an NCO group content of 20.0%.

100 g of the curing agent was admixed uniformly with 200 g of the principal component, and there was obtained Composition 5, which showed a viscosity of 3,500 cps. at 70° C. In the same manner as in Example 1, Composition 5 was immediately used for three-ply laminated film of PET/Al/CPP, and an adhesion test on the bond between the Al and the CPP. The results are as shown below:
Adhesion strength; 1,350 g/15 mm.
Adhesion strength after hot-water sterilization: 1,200 g/15 mm.
The degree of delamination after hot-water sterilization; the same as before the sterilization.

REFERENCE EXAMPLE 1

A mixture of 500 g of polyoxypropylene glycol (mol. weight 1,000) and 4.6 g of N-(diethoxymethylsilylpropyl)ethylenediamine was heated at 90° C., and 50 g of the epoxy resin as used in Example 1 was added and dissolved uniformly. Then, the temperature of the solution was lowered to 70° C., and 360 g of diphenylmethane-diisocyanate was added. The reaction was conducted at 70° C. for 3 hours, yielding an adhesion composition having an NCO group content of 7.6% and a viscosity of 800 cps. at 90° C. In the same manner as in Example 1, the adhesive composition was used for three-ply laminated film of PET/Al/CPP at 90° C., and an adhesion test on the bond between the Al and the CPP was conducted. The results are as shown below:
Adhesion strength; 700 g/15 mm.
Adhesion strength after hot-water sterilization; None
The degree of delamination after hot-water sterilization; completely delaminated.

REFERENCE EXAMPLE 2

A 411 g portion of the polyester glycol with a molecular weight of 600 as used in Example 4 was admixed uniformly with 2.5 g of γ-glycidoxypropyltrimethoxysilane at 60° C., and there was obtained a polyol component (principal component) having a viscosity of 2,500 cps. at 60° C. and a hydroxyl value of 182 mg KOH/g. 230 g of the principal component was admixed uniformly at 60° C. with 100 g of the liquid diphenylmethane diisocyanate employed in Example 4 as a curing agent, and there was obtained a composition having a viscosity of 1,000 cps. at 60° C. In the same manner as in Example 1, the composition was immediately used for three-ply laminated film of PET/Al/CPP, and an adhesion test on the bond between the Al and the CPP was conducted. The results are as shown below:
Adhesion strength; 950 g/15 mm.
Adhesion strength after hot-water sterilization; 350 g/15 mm.
The degree of delamination after hot-water sterilization; partially delaminated.

EXAMPLE 6

A solution consisting of a mixture of 100 g of a polyester glycol (mol. weight 2,000) having the composition of isophthalic acid/sebacic acid=1/1 in molar ratio and ethylene glycol/neopentyl glycol=1/1 in molar ratio, 8.7 g of tolylene diisocyanate (2,4/2,6-isomer=80/20), 109.0 g of ethyl acetate and 0.03 g of dibutyltin dilaurate was allowed to react at 60° C. for 5 hours, and 1.0 g of ethylene glycol, 33 g of the epoxy resin as used in Example 1, 1 g of vinyltriethoxysilane, 34 g of ethyl acetate and 0.4 g of monoethyl orthophosphate were added to the solution. The reaction was carried out for further one hour, and there was obtained a polyurethane polyol (principal component) having a solid content of 50%, a hydroxyl value of 25 mg KOH/g and a viscosity of 1,200 cps. at 25° C.

A solution consisting of a mixture of 174.2 g of tolylene diisocyanate, 44.7 g of trimethylolpropane and 73.0 g of ethyl acetate was allowed to react at 65° C. for 3 hours, and there was obtained a polyurethane polyisocyanate (curing agent) having a solid content of 75%, an NCO group content of 14.4% and a viscosity of 1,000 cps. at 25° C.

100 g of the principal component and 10 g of the curing agent were mixed and diluted with ethyl acetate to a solid content of 25%. By means of a laminator, the solution was applied to an application rate of 3.0 g/m² for three-ply laminated film of PET/Al/CPP. The adhesive thus applied was allowed to cure for adhesion at 40° C. for 3 days, and the adhesion test as described in Example 1 was conducted. The results are as shown below:
Adhesion strength; 1,400 g/15 mm.
Adhesion strength after hot-water sterilization; 1,400 g/15 mm.
The degree of delamination after hot-water sterilization; the same as before the sterilization.

EXAMPLE 7

A 100 g portion of the polyester glycol (mol. weight 10,000) consisting of isophthalic acid/adipic acid=1/1 in molar ratio and diethylene glycol, 20 g of the epoxy resin as used in Example 2 and 121 g of ethyl acetate were mixed at 70° C. to a uniform solution, to which 0.4 g of metaphosphoric acid and 0.6 g of γ-glycidoxypropyltrimethoxysilane were added. By this procedure, there was obtained a principal component having a solid content of 50%, a hydroxyl value of 15 mg KOH/g and a viscosity of 1,500 cps. at 25° C.

100 g of the principal component was admixed with 10 g of the curing agent as used in Example 6, and the mixture was diluted with ethyl acetate to a solid content of 25%. By means of a dry laminator, the solution was applied to an application rate of 3.0 g/m² for the lamination of a three-ply laminated film of PET/Al/CPP. The adhesive thus applied was allowed to cure for adhesion at 40° C. for 3 days, and the adhesion test as described in Example 1 was conducted. The results are as shown below:
Adhesion strength: 1,500 g/15 mm.
Adhesion strength after hot-water sterilization; 1,450 g/15 mm.
The degree of delamination after hot-water sterilization; the same as before the sterilization.

REFERENCE EXAMPLE 3

Using the principal component of Example 6 without the addition of orthophosphoric acid and the curing agent, an adhesion test was conducted by the same procedure as in Example 6. The results are as shown below:
Adhesion strength; 1,000 g/15 mm.
Adhesion strength after hot-water sterilization; 400 g/15 mm.
The degree of delamination after hot-water sterilization; partially delaminated.

EXAMPLE 8

A solution consisting of a mixture of 100 g of the polyester glycol with a molecular weight of 2,000 as used in Example 6, 11.1 g of 3-isocyanatomethyl-3,5,5-trimethylcyclohexylisocyanate, 111.1 g of ethyl acetate and 0.03 g of dibutyltin dilaurate was allowed to react at 65° C. for 7 hours, and 2.1 g of diethylene glycol, 22.2 g of an epoxy resin (mol. weight 1600, epoxy equivalent 925; Epicote 1004 ®; produced by Shell Chemical Co.), 1.1 g of vinyltrichlorosilane, 0.2 g of phosphoric acid and 25.6 g of ethyl acetate were added to the solution. The reaction was carried out for further one hour, and there was obtained a polyurethane polyol (principal component) having a solid content of 50%, a hydroxyl value of 19 mg KOH/g and a viscosity of 1,500 cps. at 25° C.

A solution consisting of a mixture of 111.2 g of 3-isocyanatomethyl-3,5,5-trimethylcyclohexylisocyanate, 22.3 g of trimethylolpropane, 44.5 g of ethyl acetate and 0.03 g of dibutyltin dilaurate was allowed to react at 65° C. for 4 hours, and there was obtained a polyurethane polyisocyanate (curing agent) having a solid content of 75%, an NCO group content of 11.8% and a viscosity of 3,000 cps. at 25° C.

100 g of the principal component was admixed with 15 g of the curing agent, and the mixture was diluted with ethyl acetate to a solid content of 25%. By means of a dry laminator, the solution was applied to an application rate of 3.0 g/m² for the lamination of a three-ply laminated film of PET/Al/CPP. The adhesive thus applied was allowed to cure for adhesion at 40° C. for 3 days, and the adhesion test as described in Example 1 was conducted. The results are as shown below:

Adhesion strength; 1,200 g/15 mm.
Adhesion strength after hot-water sterilization; 1,300 g/15 mm.
The degree of delamination after hot-water sterilization; the same as before the sterilization.

EXAMPLE 9

A solution consisting of a mixture of 500 g of polyethylenebutylene adipate (mol. weight 2,000, ethylene glycol/1,4-butylene glycol=1/1 in molar ratio), 26.5 g of diethylene glycol and 1.3 g of an adduct from pyrophosphoric acid and propylene oxide (1/1.6 in molar ratio) was heated at 90° C., and 50 g of an epoxy resin (mol. weight 900, epoxy equivalent 450; Epicote 1001 ®; produced by Shell Chemical Co.) and 7.6 g of γ-mercaptopropyltrimethoxysilane were added to it and dissolved uniformly. Then, the temperature of the solution was lowered to 70° C., and 417.8 g of xylylene diisocyanate was added. The reaction was conducted at 70° C. for 4 hours. The reaction solution was freed of the unreacted isocyanate monomer by the thin-layer distillation method at 180° C. under a vacuum of 1 mmHg, and there was obtained 764 g of a residue, thus yielding an adhesive composition having an NCO content of 4.7% and a viscosity of 2,000 cps. at 90° C.

By the same procedure as in Example 1, the composition was used for three-ply laminated film of PET/Al/CPP, and an adhesion test on the bond between the Al and the CPP was conducted. The results are as shown below:

Adhesion strength; 1,300 g/15 mm.
Adhesion strength after hot-water sterilization; 1,350 g/15 mm.
The degree of delamination after hot-water sterilization; The same as before the sterilization.

EXAMPLE 10

A solution consisting of a mixture of 100 g of a polyester glycol (mol. weight 2,000) prepared from isophthalic acid, sebacic acid, ethylene glycol and neopentyl glycol (isophthalic acid/sebacic acid=1/1 in molar ratio and ethylene glycol/neopentyl glycol=⅔ in molar ratio), 7.1 g of 3-isocyanatomethyl-3,5,5-trimethylcyclohexylisocyanate, 116.5 g of ethyl acetate and 0.02 g of dibutyltin dilaurate was allowed to react at 65° C. for 10 hours. Then, to the reaction mixture, 132.2 g of a polyester glycol (mol. weight 6,000) prepared from isophthalic acid, adipic acid, ethylene glycol, neopentyl glycol and 1,6-hexanediol (isophthalic acid/adipic acid=3/1 in molar ratio and ethylene glycol/neopentyl glycol/1,6-hexane diol=3/2/2 in molar ratio), 0.5 g of diethylene glycol, 139.7 g of ethyl acetate, 12.2 g of the epoxy resin as used in Example 1, 2.63 g of γ-glycidoxypropyltrimethoxysilane, 1.07 g of N-(triethoxysilyl propyl)ethylenediamine and 0.38 g of phosphoric acid were added and dissolved uniformly at 65° C. The reaction was carried out for further one four, and there was obtained a polyol component (principal component) having a solid content of 50%, a hydroxyl value of 13 mg KOH/g and viscosity of 600 cps. at 25° C.

A solution consisting of a mixture of 111.2 g of 3-isocyanatomethyl-3,5,5-trimethylcyclohexylisocyanate, 22.3 g of trimethylolpropane, 44.5 g of ethyl acetate and 0.03 g of dibutyltin dilaurate was allowed to react at 65° C. for 4 hours, and there was obtained a polyurethane polyisocyanate (curing agent) having a solid content of 75%, an NCO group content of 11.8% and a viscosity of 3,000 cps. at 25° C.

100 g of the principal component was admixed with 10 g of the curing agent, and the mixture was diluted with ethyl acetate to a solid content of 25%. By means of a dry laminator, the solution was applied to an application rate of 3.0 g/m² for the lamination of a three-ply laminated film of PET/Al/CPP. The adhesive thus applied was allowed to cure for adhesion at 40° C. for 3 days, and the adhesion test as described in Example 1 was conducted. The results are as shown below:

Adhesion strength; 1,250 g/15 mm.
Adhesion strength after hot-water sterilization; 1,300 g/15 mm.
The degree of delamination after hot-water sterilization; the same as before the sterilization.

EXAMPLE 11

A solution consisting of a mixture of 200 g of a polyoxypropylene glycol (mol. weight 400), 84.7 g of xylylene diisocyanate, 284.7 g of ethyl acetate and 0.05 g of dibutyltin dilaurate was allowed to react at 65° C. for 4 hours.

Then, to the reaction mixture, 400 g of a polyester glycol (mol. weight 8,000) prepared from isophthalic acid, azelaic acid, ethylene glycol, neopentyl glycol and 1,6-hexanediol (isophthalic acid/azelaic acid=1/1 in molar ratio and ethylene glycol/neopentyl glycol/1,6-hexanediol=1/1/1 in molar ratio), 440.8 g of ethyl acetate, 40 g of the epoxy resin as used in Example 9 and 0.8 g of pyrophosphoric acid were added and dissolved uniformly at 65° C. The reaction was carried out for further one hour, and there was obtained a polyol component (principal component) having a solid content of 50%, a hydroxyl value of 11 mg KOH/g and a viscosity of 1,200 cps. at 25° C.

A solution consisting of a mixture of 94.1 g of xylylene diisocyanate, 22.3 g of trimethylolpropane, 38.8 g of ethyl acetate and 0.03 g of dibutyltin dilaurate was allowed to react at 65° C. for 4 hours, and there was obtained a polyurethane polyisocyanate (curing agent) having a solid content of 75%, an NCO group content of 13.5% and a viscosity of 400 cps. at 25° C.

100 g of the principal component was admixed with 10 g of the curing agent, and the mixture was diluted with ethyl acetate to a solid content of 25%. By means of a dry laminator, the solution was applied to an application rate of 3.0 g/m² for the lamination of a three-ply laminated film of PET/Al/CPP. The adhesive thus applied was allowed to cure for adhesion at 40° C. for 3 days, and the adhesion test as described in Example 1 was conducted. The results are as shown below:

Adhesion strength; 1,200 g/15 mm.

Adhesion strength after hot-water sterilization; 1,150 g/15 mm.

The degree of delamination after hot-water sterilization; the same as before the sterilization.

EXAMPLE 12

A solution consisting of a mixture of 160 g of a polyester glycol (mol. weight 1,600) prepared from isophthalic acid, adipic acid and ethylene glycol (isophthalic acid/adipic acid=1/1 in molar ratio), 17.4 g of tolylene diisocyanate (2,4-/2,6-=80/20), 177.4 g of ethyl acetate and 0.03 g of dibutyltin dilaurate was allowed to react at 65° C. for 5 hours. Then, to the reaction mixture, 200 g of a polyester glycol (mol. weight 10,000) prepared from isophthalic acid, azelaic acid, ethylene glycol, diethylene glycol and neopentyl glycol (isophthalic acid/azelaic acid=2/1 in molar ratio and ethylene glycol/diethylene glycol/neopentyl glycol=2/1/1 in molar atio), 5 g of ethylene glycol, 279 g of ethyl acetate, 70 g of the epoxy resin as used in Example 9, 3.8 g of γ-glycidoxypropyltrimethoxysilane, 0.2 g of polyphosphoric acid composed mainly of tetrapolyphosphoric acid were added and dissolved uniformly at 65° C. The reaction was carried out for further one hour, and there was obtained a polyol component (principal component) having a solid content of 50%, a hydroxyl value of 22 mg KOH/g and a viscosity of 1,500 cps. at 25° C.

A solution consisting of a mixture of 125.1 g of 4,4'-diphenylmethanediisocyanate, 22.3 g of trimethylolpropane, 79.3 g of ethyl acetate and 0.03 g of dibutyltin dilaurate was allowed to react at 65° C. for 4 hours, and there was obtained a polyurethane polyisocyanate (curing agent) having a solid content of 65%, an NCO group content of 9.3% and a viscosity of 2,500 cps. at 25° C.

100 g of the principal component was admixed with 10 g of the curing agent, and the mixture was diluted with ethyl acetate to a solid content of 25%. By means of a dry laminator, the solution was applied to an application rate of 3.0 g/m² for the lamination of a three-ply laminated film of PET/Al/CPP. The adhesive thus applied was allowed to cure for adhesion at 40° C. for 3 days, and the adhesion test as described in Example 1 was conducted. The results are as shown below:

Adhesion strength; 1,200 g/15 mm.

Adhesion strength after hot-water sterilization; 1,250 g/15 mm.

The degree of delamination after hot-water sterilization; the same as before the sterilization.

What is claimed is:

1. A polyurethane adhesive composition, which comprises an organic polyisocyanate, a polyol, about 0.01 to 10 weight percent based on the total adhesive composition of an oxyacid of phosphorus or a derivative thereof, about 1 to 50 weight percent based on the total adhesive composition of an epoxy resin and about 0.05 to 20 weight percent based on the total adhesive composition of a silane coupling agent and wherein the ratio of the number of the NCO groups of the organic polyisocyanate to the number of active hydrogen groups of the polyol, the oxyacid of phosphorus or the derivative thereof and the epoxy resin is in the range of about 0.4 to 20.

2. A polyurethane adhesive composition claimed in claim 1, which is obtained by reacting a mixed solution of the polyol, the oxyacid of phosphorus or the derivative thereof, the epoxy resin and the silane coupling agent with the organic polyisocyanate, wherein the NCO/(the active hydrogen group (H) of the polyol, the oxyacid of phosphorus or the derivative thereof and the epoxy resin) ratio is about 1.5 to 20.

3. A polyurethane adhesive composition claimed in claim 1, wherein a mixture of the polyol, the oxyacid of phosphorus or the derivative thereof, the epoxy resin and the silane coupling agent constitutes the principal component and the organic polyisocyanate is a curing agent, the NCO/(the active hydrogen group (H) of the polyol, the oxyacid of phosphorus or the derivative thereof and the epoxy resin) ratio being about 0.4 to 10.

4. A polyurethane adhesive composition claimed in claim 1, wherein the silane coupling agent is a compound having the structural formula:

R—Si≡(X)₃ or R—Si≡(R')(X)₂ wherein R is an organic group having a vinyl, epoxy, amino, imino or mercapto group; R' is a C1–8 alkyl group; X is methoxy, ethoxy or chlorine.

5. A polyurethane adhesive composition claimed in claim 4, wherein the silane coupling agent is N-(diethoxymethylsilylpropyl)ethylenediamine.

6. A polyurethane adhesive composition claimed in claim 4, wherein the silane coupling agent is γ-glycidoxypropyltrimethoxysilane.

7. A polyurethane adhesive composition claimed in claim 4, wherein the silane coupling agent is vinyltriethoxysilane.

8. A polyurethane adhesive composition claimed in claim 4, wherein the silane coupling agent is vinyltrichlorosilane.

9. A polyurethane adhesive composition claimed in claim 4, wherein the silane coupling agent is γ-mercaptopropyltrimethoxysilane.

* * * * *